US012580346B2

(12) United States Patent
Mittelbach

(10) Patent No.: US 12,580,346 B2
(45) Date of Patent: Mar. 17, 2026

(54) PLUG-IN DEVICE, PLUG-IN SYSTEM WITH A PLUG-IN DEVICE, AS WELL AS ROBOT WITH A PLUG-IN DEVICE

(71) Applicant: IMS GEAR SE & Co. KGaA, Donaueschingen (DE)

(72) Inventor: Marcel Mittelbach, Schluchsee (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 330 days.

(21) Appl. No.: 18/234,079

(22) Filed: Aug. 15, 2023

(65) Prior Publication Data

US 2024/0055800 A1 Feb. 15, 2024

(30) Foreign Application Priority Data

Aug. 15, 2022 (EP) ..................................... 22190406

(51) Int. Cl.
| | |
|---|---|
| *H01R 13/631* | (2006.01) |
| *B25J 18/00* | (2006.01) |
| *B60L 53/16* | (2019.01) |
| *B60L 53/35* | (2019.01) |
| *H01R 13/73* | (2006.01) |

(52) U.S. Cl.
CPC ............ *H01R 13/631* (2013.01); *B25J 18/00* (2013.01); *B60L 53/16* (2019.02); *B60L 53/35* (2019.02); *H01R 13/73* (2013.01)

(58) Field of Classification Search
CPC ....... H01R 13/631; H01R 13/73; B60L 53/35; B60L 53/16; B25J 18/00

USPC ................................... 439/10, 378, 246, 247
See application file for complete search history.

(56) References Cited

U.S. PATENT DOCUMENTS

| | | | | |
|---|---|---|---|---|
| 6,157,162 A | * | 12/2000 | Hayashi | ................ H02J 7/0042 320/104 |
| 12,214,685 B2 | * | 2/2025 | Van Der Weijde | ..... B60L 53/37 |

FOREIGN PATENT DOCUMENTS

| | | | | |
|---|---|---|---|---|
| CA | 3138743 A1 | * | 11/2020 | .............. B60L 53/37 |
| CN | 104134908 A | | 11/2014 | |
| CN | 107302155 A | | 10/2017 | |
| CN | 118876751 A | * | 11/2024 | .............. B60L 53/35 |
| DE | 102013225196 A1 | * | 6/2015 | .............. B60L 53/36 |

OTHER PUBLICATIONS

European Search Report issued Jan. 24, 2023 for corresponding application EP 22190406.3.

* cited by examiner

*Primary Examiner* — Hae Moon Hyeon
(74) *Attorney, Agent, or Firm* — Nath, Goldberg & Meyer; Jerald L. Meyer; Morgan D. Rosenberg

(57) ABSTRACT

A plug-in device is provided. The plug-in device includes a plug-in unit and a mounting module. The plug-in unit includes a first plug-in element having a plug-in axis and a plug-in direction, and at least one first alignment element. The mounting module includes a first bearing unit, by which the plug-in unit is mounted rotatably about a first axis and is mounted displaceably along the first axis, a second bearing unit (34), by which the plug-in unit is mounted rotatably about a second axis and is mounted displaceably along the second axis, and a third bearing unit, by which the plug-in unit is mounted rotatably about a third axis.

12 Claims, 4 Drawing Sheets

PLUG-IN DEVICE, PLUG-IN SYSTEM WITH A PLUG-IN DEVICE, AS WELL AS ROBOT WITH A PLUG-IN DEVICE

BACKGROUND

Field

The invention relates to a plug-in device, a plug-in system with a plug-in device, as well as a robot with a plug-in device.

Description of Related Art

The increasing effort to automate activities that were previously carried out manually, including outside the industrial environment, also requires solutions at the level of the components involved that enable such automation.

Both conductive and inductive systems are known for charging electrically powered vehicles. Whereas inductive systems enable contactless charging, conductive charging requires the vehicle to be connected to a cable. Inductive systems can therefore be a simple way of charging from the point of view of the user. In comparison to conductive systems, inductive systems however have significantly higher transmission losses. For this reason, efforts are being made to make conductive charging easier for the user and to automate the connection of the vehicle to the cable, which has so far been done manually.

For this purpose, in particular, robots are used that autonomously move under the vehicle with the charging plug, where they find a charging socket located under the vehicle and insert the charging plug in a substantially vertical manner into the charging socket (so-called ACDU system, ACDU for "Automatic Connection Device Underbody"). Similarly, robot-assisted systems are known which, when the charging socket is located on the side of the vehicle, autonomously insert the charging plug in a substantially horizontal manner into the charging socket (so-called ACDS system, ACDS for "Automatic Connection Device Side").

Both systems have in common that complex sensor technology must be used to position and insert the charging plug as precisely as possible opposite the charging socket, not least because the standardized plugs used are often very sensitive to angular misalignment during the plugging process. In this manner, even a few degrees of misalignment can lead to high wear of the contact pins.

In order to achieve the most accurate positioning of the plug, high-precision Light Detection and Ranging (LIDAR) sensors are therefore often used to position the plug by the robot. The disadvantage of this solution is that such sensor systems are very expensive. In addition, such sensor systems are often sensitive to contamination.

A solution is moreover known whereby the mating face of the charging plug is changed in such a way that the charging plug is less sensitive to misalignment, so that a system with a lesser positioning accuracy and less expensive sensor technology can be used. The disadvantage of this solution is that charging plugs that are already certified and standardized cannot be used.

The invention is therefore based on the task of providing a device that enables the precise positioning of a plug and can be manufactured at low cost and is insensitive to external influences.

SUMMARY

A plug-in device according to the invention comprises a plug-in unit having a first plug-in element with a plug-in axis and a plug-in direction, as well as at least one first alignment element. The plug-in direction preferably describes the direction of the plug-in axis in which the first plug-in element is moved for plugging, which is to say, for establishing a connection with a second plug-in element. According to the invention, the plug-in device further comprises a mounting module, comprising a first bearing unit, by means of which the plug-in unit is mounted rotatably about a first axis and displaceably along the first axis, a second bearing unit, by means of which the plug-in unit is mounted rotatably about a second axis and displaceably along the second axis, as well as a third bearing unit, by means of which the plug-in unit is mounted rotatably about a third axis. Preferably, the plug-in unit is exclusively mounted rotatably about the third axis.

Such a mounting allows the plug-in unit to be arranged in a very flexibly movable manner. As a result, the plug-in unit can be easily aligned translationally and rotationally by the at least one first alignment element in the manner required for a plug-in process, so that the tolerances required for the first plug-in element are maintained during the plug-in process. For this purpose, the at least one first alignment element is preferably immovably connected to the first plug-in element. The plug-in unit particularly preferably has a main body on which the first plug-in element and the at least one first alignment element are immovably arranged. The at least one first alignment element is preferably a purely mechanical component by means of which the plug-in unit can be aligned by purely mechanical means after the plug-in unit has already been approximately positioned relative to the second plug-in element with the aid of a sensor system. The at least one first alignment element is therefore preferably brought into a mechanical operative connection with at least one second alignment element arranged on the side of the second plug-in element.

The first axis and the second axis, as well as the second axis and the third axis, are preferably arranged perpendicular to one another. In this manner, the plug-in unit can preferably be moved in any direction in the plane spanned by the first axis and the second axis. Such an arrangement, moreover, allows the plug-in unit to be rotated in any spatial direction.

The third axis and the plug-in axis are particularly preferably arranged parallel to one another. Here and in the following, the term "parallel" is understood to include two axes one superimposed on the other. Due to the rotatable mounting about the third axis, the plug-in unit can be rotationally aligned about the plug-in axis with such an arrangement. Together with the previously described perpendicular arrangement of the first axis and the second axis, as well as the second axis and the third axis with respect to one another, the plug-in unit can moreover be aligned transversely to the plug-in direction. The plug-in unit is preferably mounted in a non-displaceable manner along the third axis. With the preferred parallel arrangement of the third axis and the plug-in axis, any misalignment along the third axis can thus be compensated for by the plug-in process itself.

In a preferred embodiment of the invention, the third bearing unit together with the plug-in unit is mounted rotatably about the second axis and displaceably along the second axis, and the second bearing unit together with the third bearing unit is mounted rotatably about the first axis and displaceably along the first axis. This can allow for a compact and robust design of the plug-in device. In particular, as regards the rotational mounting, the mounting principle applied to the plug-in device can correspond to a gimbal mounting. The mounting with respect to the second axis is preferably carried out by means of the second bearing unit. The mounting with respect to the first axis is preferably carried out by means of the first bearing unit.

Preferably, the plug-in device has two cages, one as part of the second bearing unit and another as part of the third bearing unit. The first bearing unit typically does not comprise a cage. For the sake of clarity and to simplify their designation, the cage belonging to the second bearing unit is preferably referred to as the second bearing cage and the cage belonging to the third bearing unit is referred to as the third bearing cage-preferably without a first cage being present.

The first bearing unit preferably comprises two first bearing pins aligned along the first axis. The second bearing unit preferably comprises two second bearing pins aligned along the second axis, as well as a second bearing cage. The second bearing cage can be arranged axially and rotationally movable with respect to the first axis on the first bearing pins. This allows for the achievement of rotational and translatory movement of the plug-in unit with respect to the first axis. The second bearing pins are preferably arranged in a fixed manner to the second bearing cage. The third bearing unit preferably comprises a third bearing cage. The third bearing cage is preferably arranged within the second bearing cage. The third bearing cage can be arranged on the second bearing cage by means of the second bearing pins. The third bearing cage can be arranged axially and rotationally movable with respect to the second axis at the second bearing pins. In this way, the rotational and translatory mobility of the plug-in unit with respect to the second axis can be achieved. The plug-in unit is preferably arranged in the third bearing cage by means of a sliding bearing. The plug-in unit can thereby be arranged surrounded by the mounting module in the plug-in device. The sliding bearing can be configured in such a way that it allows a rotational movement of the plug-in unit about the third axis. The sliding bearing can be formed by the mutually facing surfaces of the third bearing cage and the plug-in unit. Preferably, the second bearing cage and the third bearing cage are configured in an annular shape. The mounting module and thereby also the plug-in unit can be mounted relative to the rest of the plug-in device by means of the first bearing pins.

In a preferred embodiment of the invention, the plug-in unit is resiliently mounted along the first axis and/or along the second axis. This allows the plug-in unit to automatically always arrange itself in the same translatory position with respect to the first axis and/or the second axis when the first plug-in element is not plugged in. This can be particularly advantageous for an approximate positioning of the plug-in unit. For resilient mounting of the plug-in unit along the first axis, the two first bearing pins can respectively have a first coil spring which springs are arranged to oppose one another along the first axis, so that with identical first coil springs the plug-in unit is aligned centrally between the two first bearing pins. Preferably, the first coil springs are arranged about the first bearing pins and are supported on the one hand by a shaft shoulder arranged on the respective first bearing pin and on the other hand by the second bearing cage. For resilient mounting of the plug-in unit along the second axis, the two second bearing pins can respectively have a second coil spring which springs are arranged to oppose one another along the second axis, so that with identical second coil springs the plug-in unit is aligned centrally between the two second bearing pins and thus preferably centrally in the second bearing cage. The second coil springs are particularly preferably arranged between the second bearing cage and the third bearing cage about the second bearing pins and can therefore be supported on the second bearing cage, on the one hand, and on the third bearing cage, on the other hand.

The plug-in unit can be resiliently mounted about the third axis. This allows the plug-in unit to automatically always arrange itself in the same rotational position with respect to the third axis when the first plug-in element is not plugged in. This can be particularly advantageous for an approximate positioning of the plug-in unit. For resilient mounting of the plug-in unit about the third axis, the plug-in device can have at least one spring element supported on the plug-in unit on the one hand and on the third bearing cage on the other. The third bearing cage can, in particular, have two opposing projections, each of which can be arranged in a recess of the main body. Two spring elements, acting in opposite directions, can be arranged in each of the recesses between the projection and the main body.

In a preferred embodiment of the invention, the first axis, the second axis and the third axis intersect in an axis intersection point. As a result, the plug-in unit, in particular, can be arranged in a particularly flexible manner. It is thereby also particularly easy to calculate the forces acting on the plug-in unit, which are caused, for example, by a plug-in unit center of gravity of the plug-in unit.

Preferably, the plug-in unit center of gravity of the plug-in unit is arranged on the third axis opposite to the plug-in direction, away from the axis intersection point. An automatic horizontal orientation of the plug-in unit can thereby be achieved, in particular, with symmetrical configuration and arrangement of the other components of the plug-in device mounted by means of the first bearing unit, in particular of the second and third bearing cage. This can be particularly advantageous if the plug-in device is configured to insert the plug-in element in a vertical direction from bottom to top.

A force application point can moreover be arranged on the plug-in unit for orientation of the plug-in unit. The force application point preferably designates a point of application of a force acting on the plug-in unit from outside the plug-in unit and, therefore, an external force. The force application point is preferably arranged on a rear side of the plug-in unit. Here and in the following, the rear side preferably refers to the side of the plug-in unit that is arranged opposite the side of the plug-in unit intended to be plugged in, which is defined by the plug-in element and which is aligned opposite the plug-in direction. A traction element, such as a tension spring or a cable with an orientation spring element, can be arranged at the force application point, wherein the traction element is preferably arranged beyond the first bearing unit at a fixed point. The force application point is preferably located on the third axis and is arranged opposite to the plug-in direction away from the axis intersection point. A traction direction of the traction element preferably points against the plug-in direction. The force application point thereby enables the plug-in unit to be oriented independently of its gravitational orientation. Depending on the traction direction, an application-related orientation of the plug-in unit can be set. This can be particularly advantageous if the plug-in device is configured to laterally plug the plug-in element in a horizontal direction. With a vertical plug-in direction, the horizontal orientation of the plug-in element can also be affected, for example, by the force acting on the plug-in unit by means of a line leading to the plug-in element. In this case, the provision of a force application point and a traction element can also be advantageous.

Whereas, as explained above, the basic orientation of the plug-in unit can be adjusted by the arrangement of the plug-in unit center of gravity or by the provision of the force application point, the at least one first alignment element serves, in particular, for the fine adjustment of the first plug-in element to the second plug-in element. The at least one first alignment element can be arranged to be projecting beyond the first plug-in element in the plug-in direction. This allows the at least one first alignment element to come into contact with the at least one second alignment element before the first plug-in element comes into contact with the second plug-in element, which is to say, before the actual plug-in process. In this way, existing translatory and/or rotational misalignment between the first plug-in element and the second plug-in element can be compensated after the approximate positioning. The at least one first alignment element is preferably configured as a centering pin arranged parallel to the plug-in axis, which particularly preferably has an insertion cone at the end pointing in the plug-in direction.

In a preferred embodiment of the invention, the plug-in unit comprises two first alignment elements. This may bring about a more uniform alignment of the plug-in unit and can avoid a jamming of the at least one first alignment element with the at least one second alignment element. The rotational alignment of the plug-in unit about the third axis can, in particular, be facilitated. Particularly preferably, the two first alignment elements have an offset of 180° with respect to the plug-in axis.

In a further development of the invention, the plug-in device comprises a displacement unit upon which the mounting module is arranged. The displacement unit can be used, in particular, to displace the plug-in unit at least partially along the plug-in axis. Preferably, the mounting module is arranged on the displacement unit by means of the first bearing unit. The plug-in unit can thus be mounted relative to the displacement unit by means of the mounting module. The displacement unit is preferably configured as a scissors lift device.

In a further development of the invention, the first plug-in element is configured as a charging plug or as a charging socket for an electrically powered vehicle. The second plug-in element can vice versa correspondingly be configured as a charging socket or charging plug for an electrically operated vehicle. Examples of electrically operated vehicles include passenger vehicles including buses, commercial vehicles, industrial trucks or agricultural machines.

A plug-in system according to the invention comprises the previously described plug-in device, as well as a plug-in element receptacle, wherein the plug-in element receptacle comprises the second plug-in element and the at least one second alignment element which is arranged in such a way that it can be coupled with the plug-in unit. The second alignment elements are preferably tubular in shape. In the coupled state, the plug-in unit preferably has only one remaining degree of freedom with respect to the plug-in element receptacle, namely a translatory degree along the plug-in axis. For this reason, the second plug-in element and the at least one second alignment element preferably correspond in arrangement and number to the first plug-in element and the at least one first alignment element.

A robot according to the invention comprises a plug-in device described above, wherein the plug-in device can be positioned by means of the robot. This allows the plug-in process to be automated and highly accurate without the need for expensive and/or high-resolution sensors. The robot preferably has sensor technology for approximate positioning of the plug-in unit. For systems that have a substantially vertical plug-in direction, the robot can be configured, in particular, to travel the plug-in device on the ground. In addition, the displacement unit can be formed by a robotic arm of the robot. As a result, an automated plugging in can be realized independently of the plug-in direction. The robotic arm can be used on its own or in combination with a travel system.

BRIEF DESCRIPTION OF DRAWINGS

An embodiment example of the invention is elucidated on the basis of the following figures. Wherein.

DETAILED DESCRIPTION

FIGS. 1 through 7 show different views of different embodiment examples. For the sake of clarity, not all reference signs are used in each figure. The same reference signs are used for identical and/or functionally identical parts.

Figure 1:
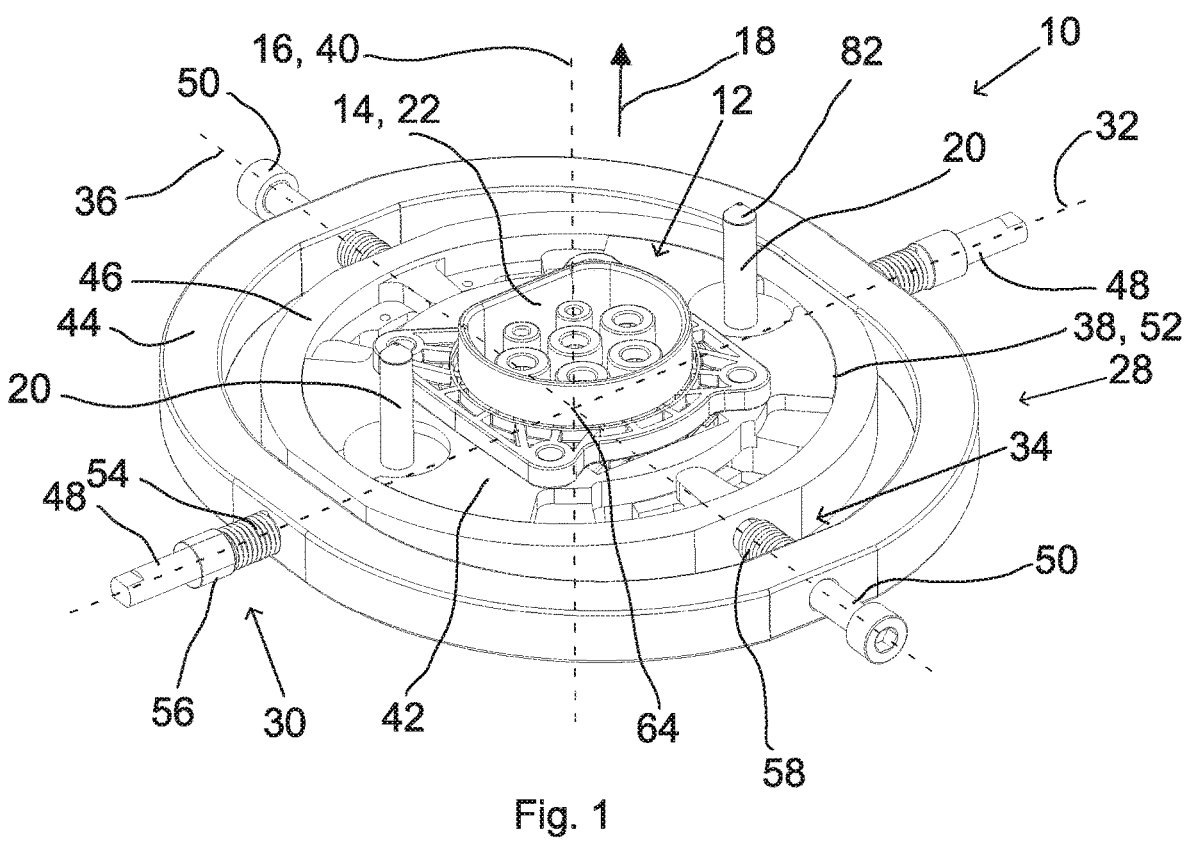
FIG. 1 shows a perspective representation of a first embodiment example of a plug-in device.
Figures 4, 5:
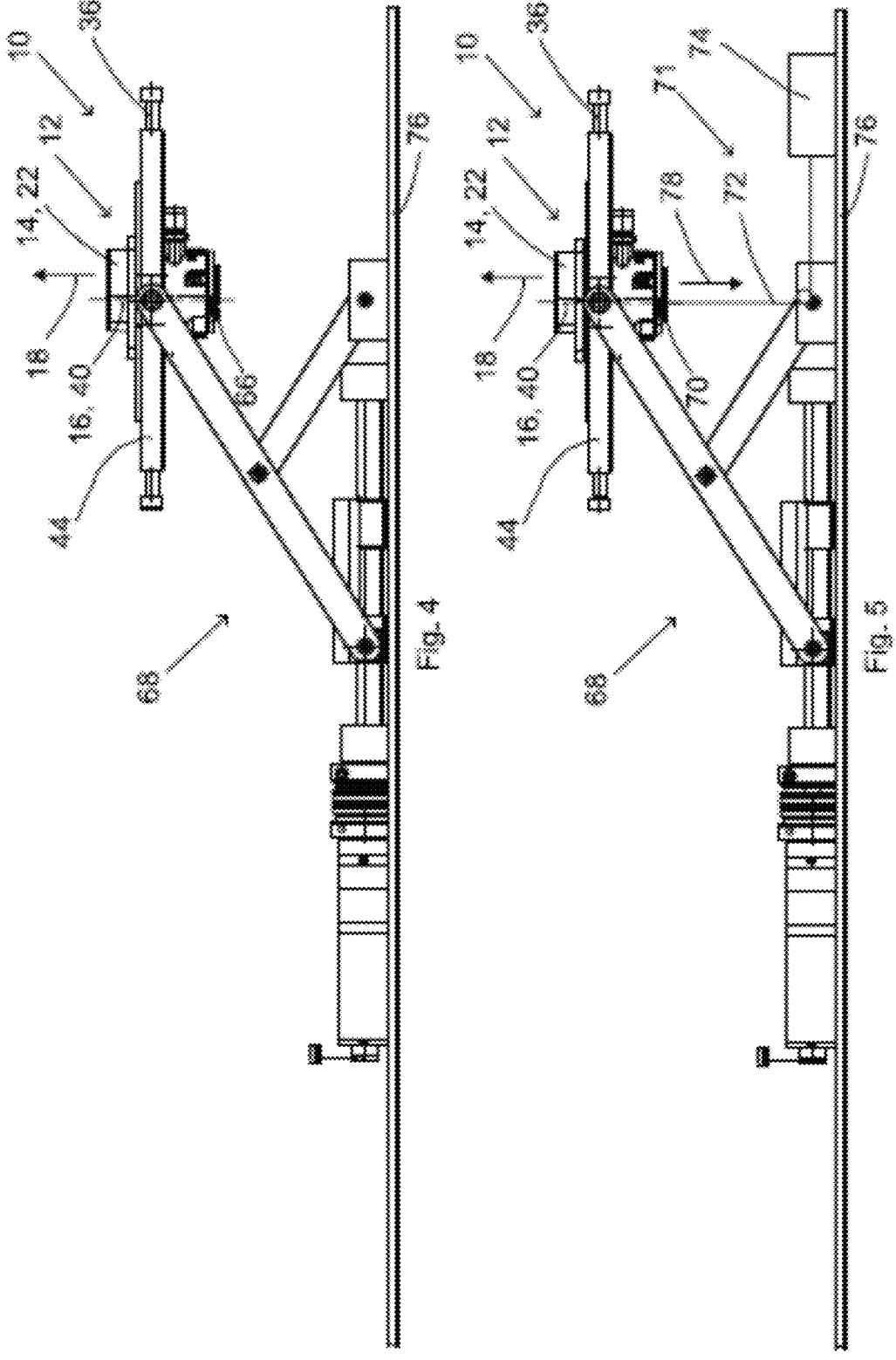
FIG. 4 shows a side view of the embodiment example shown in FIG. 3.
FIG. 5 shows a side view of a third embodiment example of a plug-in device.

FIG. 1 shows a first embodiment example of a plug-in device 10 with a plug-in unit 12, which comprises one first plug-in element 14 with one plug-in axis 16 and one plug-in direction 18, as well as two first alignment elements 20 (not shown in FIG. 4 and FIG. 5). The two first alignment elements 20 have an offset of 180° with respect to the plug-in axis 16. The first plug-in element 14 is configured as a charging plug 22 for an electrically operated vehicle.

Figure 6:
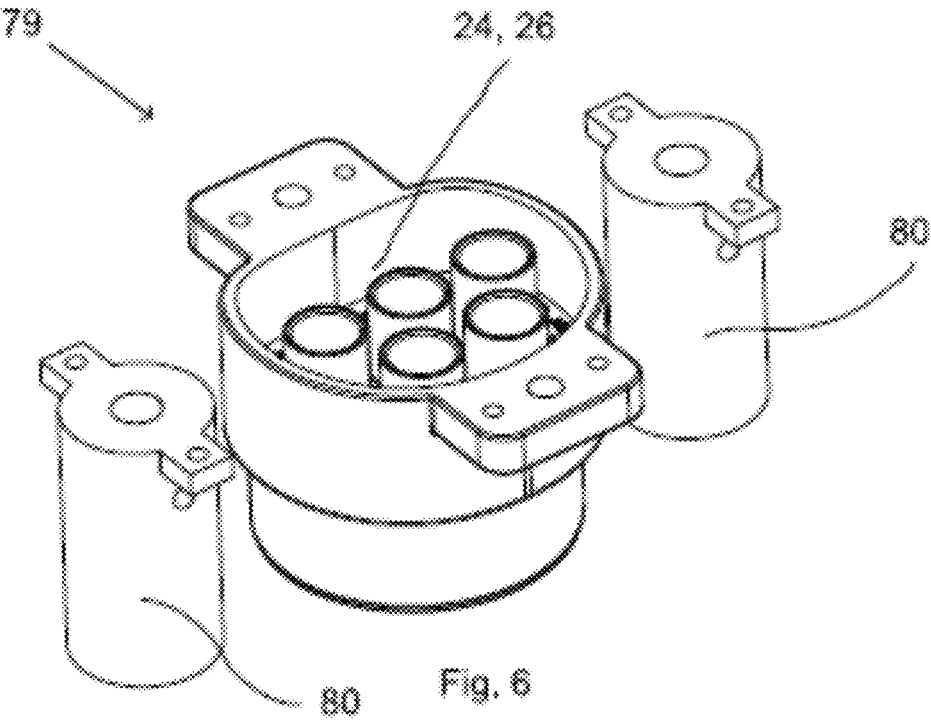
FIG. 6 shows a perspective representation of an embodiment example of a plug-in element receptacle.
Figure 7:
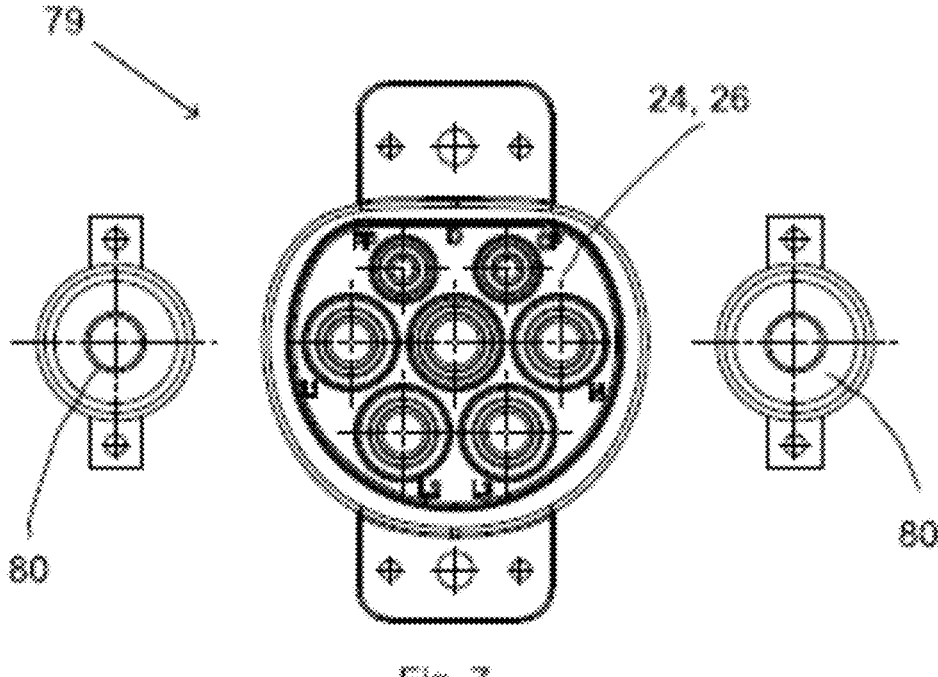
FIG. 7 shows a top view of the embodiment example shown in FIG. 6.

The plug-in direction 18 describes the direction of the plug-in axis 16 in which the first plug-in element 14 is moved for plugging in, which is to say, for establishing a connection with a second plug-in element 24. An embodiment example of the second plug-in element 24, which is configured as a corresponding charging socket 26 for an electrically operated vehicle, is shown in FIG. 6 and FIG. 7.

The plug-in device shown in FIG. 1, further comprises a mounting module 28, comprising a first bearing unit 30, by means of which the plug-in unit 12 is mounted rotatably about a first axis 32 and mounted displaceably along the first axis 32, as well as a second bearing unit 34, by means of which the plug-in unit 12 is mounted rotatably about a second axis 36 and mounted displaceably along the second axis 36, as well as a third bearing unit 38, by means of which the plug-in unit 12 is mounted rotatably about a third axis 40. The first alignment elements 20 are connected in an immovable manner to the first plug-in element 12 by means of a main body 42 of the plug-in unit.

The first axis 32 and the second axis 36, as well as the second axis 36 and the third axis 40, are respectively arranged perpendicular to one another. As a result, the plug-in unit 12 can preferably be displaced in any direction in the plane spanned by the first axis 32 and the second axis 36. Such an arrangement, moreover, allows the plug-in unit 12 to be rotated in any spatial direction.

As shown in the representation of FIG. 1, the third axis 40 and the plug-in axis 16 are arranged one superimposed over the other and are therefore parallel to one another. Due to the rotatable mounting around the third axis 40, the plug-in unit 12 can be rotationally aligned with such an arrangement around the plug-in axis 16. Together with the previously described perpendicular arrangement of the first axis 32 and the second axis 36, as well as the second axis 36 and the third axis 40 with respect to one another, the plug-in unit 12 can further be aligned transversely to the plug-in direction 18. The plug-in unit 12 is mounted in a non-displaceable manner along the third axis 40. Since the third axis 40 lies on the plug-in axis 16, any misalignment along the third axis 40 can be compensated for by the plug-in process itself.

The third bearing unit 38, together with the plug-in unit 12, is mounted rotatably about the second axis 36 and mounted displaceably along the second axis 36, and the second bearing unit 34, together with the third bearing unit 38, is mounted rotatably about the first axis 32 and mounted displaceably along the first axis 32. As regards the rotational mounting, the mounting principle applied to the plug-in device 12 thus corresponds to a gimbal mounting. The mounting with respect to the second axis 36 is carried out by means of the second bearing unit 34. The mounting with respect to the first axis 32 is carried out by means of the first bearing unit 30.

The plug-in device 10 comprises two cages 44, 46 configured in an annular shape: a second bearing cage 44 as part of the second bearing unit 34 and a third bearing cage 46 as part of the third bearing unit 38. The first bearing unit 30 does not include a cage.

The second bearing unit 34 further comprises two second bearing pins 50 aligned along the second axis 36. The first bearing unit 30 comprises two first bearing pins 48 aligned along the first axis 32. As can be seen, in particular, from FIG. 2, the second bearing cage 44 is arranged axially and rotationally movable with respect to the first axis 32 on the first bearing pins 48. This allows for the achievement of rotational and translatory movement of the plug-in unit 12 with respect to the first axis 32. The second bearing pins 50 are arranged in a fixed manner on the second bearing cage 44.

The third bearing cage 46 is arranged axially and rotationally movable with respect to the second axis within the second bearing cage 44 by means of the second bearing pins 50. This allows for the achievement of rotational and translatory movement of the plug-in unit 12 with respect to the second axis 36. The plug-in unit 12 is arranged in the third bearing cage by means of a sliding bearing 52. The plug-in unit 12 is thereby arranged surrounded by the mounting module 28 in the plug-in device. The sliding bearing 52 is configured in such a way that it allows a rotational movement of the plug-in unit 12 about the third axis 40. The sliding bearing is formed by the mutually facing surfaces of the third bearing cage 46 and the plug-in unit 12.

The plug-in unit 12 is resiliently mounted along the first axis 32 and along the second axis 36. This allows the plug-in unit 12 to automatically always arrange itself in the same translatory position with respect to the first axis 32 and the second axis 36 when the first plug-in element 14 is not plugged in. For the resilient mounting of the plug-in unit 12 along the first axis 32, the two first bearing pins 48 each have a first coil spring 54, which are arranged to oppose one another along the first axis 32, so that with identical first coil springs 54, the plug-in unit 12 is aligned centrally between the two first bearing pins 48 (see in particular FIG. 1 and FIG. 2). The first coil springs 54 are arranged about the first bearing pins 48 and are supported on the one hand by a shaft shoulder 56 arranged on the respective first bearing pin 48 and on the other hand by the second bearing cage 44.

For resilient mounting of the plug-in unit 12 along the second axis, the two second bearing pins 50 can each have a second coil spring 58, which are arranged to oppose one another along the second axis 36, so that with identical second coil springs 58, the plug-in unit 12 is aligned centrally between the two second bearing pins 50 and thus centrally in the second bearing cage 44. The second coil springs 58 are arranged between the second bearing cage 44 and the third bearing cage 46 about the second bearing pins 50 and can therefore be supported on the second bearing cage 44 on the one hand and on the third bearing cage 46 on the other hand.

The plug-in unit 12 is also resiliently mounted about the third axis 40. This allows the plug-in unit 12 to automatically always arrange itself in the same rotational position with respect to the third axis 40 when the first plug-in element 14 is not plugged in. For resilient mounting of the plug-in unit 12 about the third axis 40, the plug-in device 10 can have spring elements supported on the plug-in unit 12 on the one hand and on the third bearing cage 46 on the other hand, which are not shown. For this purpose, the third bearing cage 46 has two opposing projections 60 which are respectively arranged in a recess 62 of the main body 42. Two spring elements, acting in opposite directions, can be arranged in each of the recesses 62 between the projection 60 and the main body 42.

Figure 2:
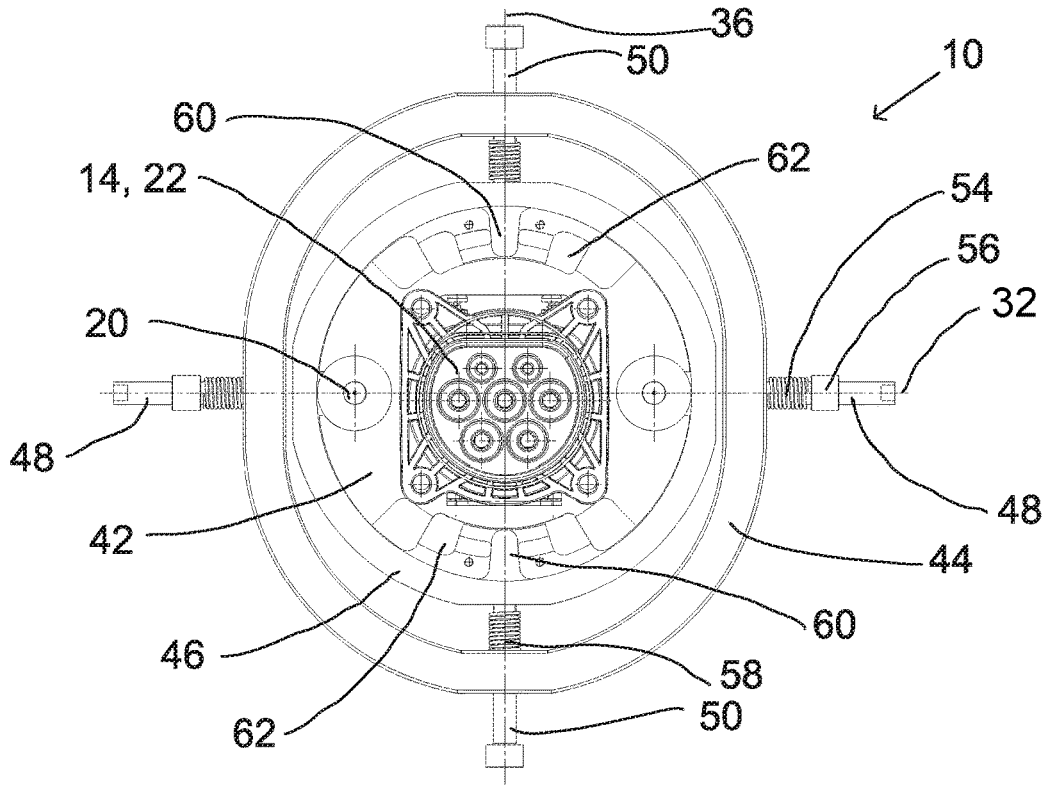
FIG. 2 shows a top view of the embodiment example shown in FIG. 1.
Figure 3:
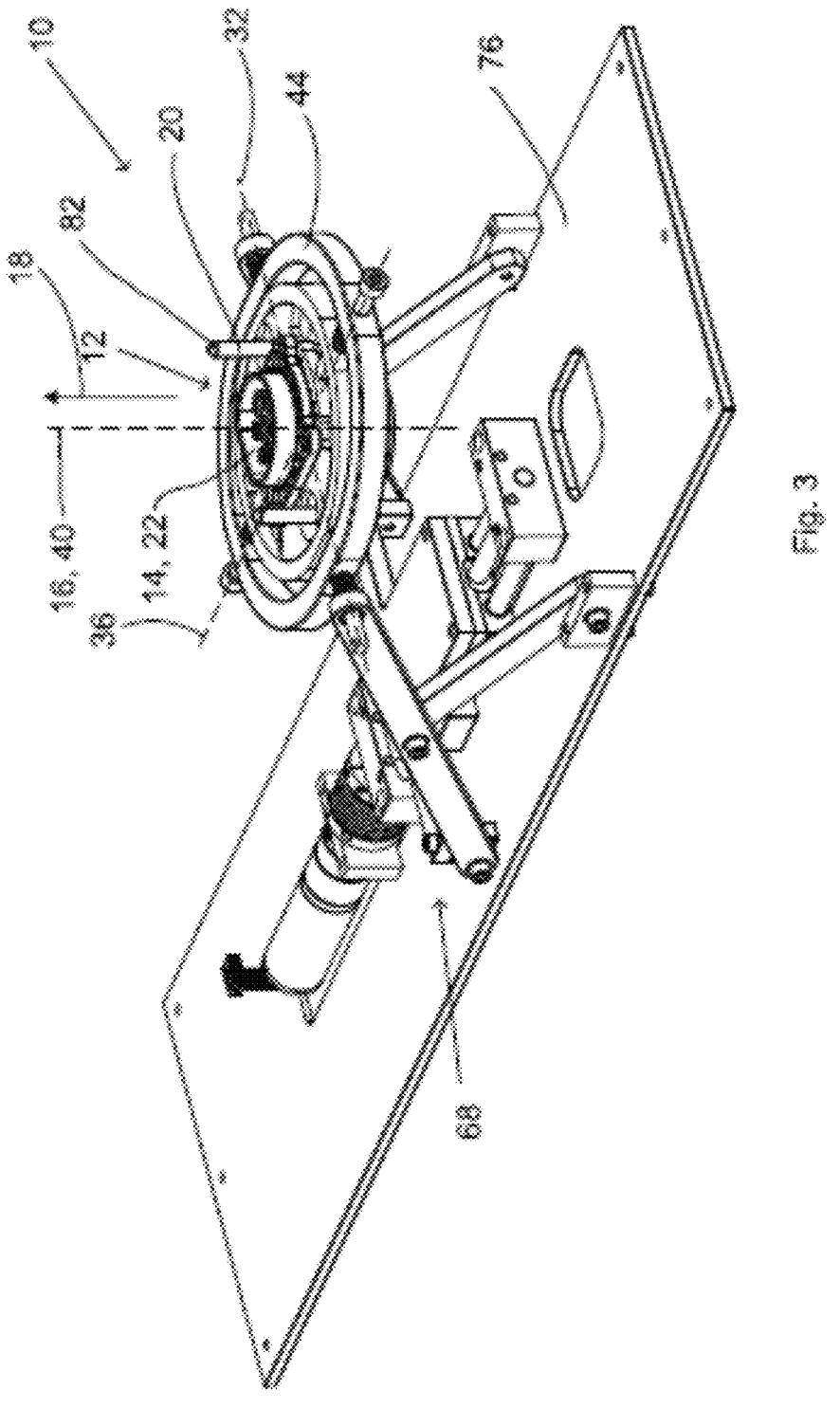
FIG. 3 shows a perspective representation of a second embodiment example of a plug-in device.

The second embodiment represented in FIG. 3 and FIG. 4 differs from the embodiment example represented in FIG. 1 and FIG. 2 in that it comprises a displacement unit 68. The plug-in unit 12 and the mounting module 28 are identical in both embodiment examples.

The first axis 32, the second axis 36 and the third axis 40 intersect in an axis intersection point 64. In the embodiments examples shown in FIG. 1 through FIG. 3, a plug-in unit center of gravity 66 of the plug-in unit 12 is arranged on the third axis 40 opposite to the plug-in direction 18, away from the axis intersection point 64. An automatic horizontal orientation of the plug-in unit 12 can thereby be achieved.

The third embodiment example represented in FIG. 5 differs from the second embodiment example represented in FIG. 3 and FIG. 4 in that a force application point 70 is arranged on the plug-in unit 12 for orientation of the plug-in unit 12. The force application point 70 is arranged on a rear side of the plug-in unit 12. A traction element 71, comprising a cable 72 with an orientation spring element 74, is arranged at the force application point 12, wherein the traction element 71 is arranged beyond the first bearing unit 30 at a base plate 76 and thereby at a fixed point beyond the first bearing unit 30. The force application point 70 is located on the third axis 40 and is arranged opposite to the plug-in direction 18 away from the axis intersection point 64. A traction direction 78 of the traction element 71 points opposite to the plug-in direction 18. Depending on the traction direction 78, an application-related orientation of the plug-in unit 12 can thereby be set.

Whereas the basic orientation of the plug-in unit 12 can be adjusted by the arrangement of the plug-in unit center of gravity 66 (first and second embodiment examples, FIG. 1 through FIG. 4) or by the provision of the force application point 70 (third embodiment example, FIG. 5), the first alignment elements 20 serve, in particular, for the fine adjustment of the first plug-in element 14 to the second plug-in element 24.

In addition to the plug-in device, a plug-in system comprises a plug-in element receptacle 79 represented in FIG. 6 and FIG. 7, which comprises the second plug-in element 24 and two second alignment elements 80. The second alignment elements 80 are arranged in such a way that they can be coupled to the first alignment elements 20.

As can, in particular, be recognized in FIG. 1, the first alignment elements 20 are arranged to be projecting beyond the first plug-in element 14 in the plug-in direction 18. This allows the first alignment elements 20 to come into contact with the second alignment elements 80 before the first plug-in element 14 comes into contact with the second plug-in element 24, which is to say, before the actual plug-in process. The first alignment elements 20 are configured as centering pins arranged parallel to the plug-in axis 16, each of which has an insertion cone 82 at the end pointing in the plug-in direction 18. The second alignment elements 80 are tubular in shape. In the coupled state, the plug-in unit 12 thus has only one remaining degree of freedom with respect to the plug-in element receptacle 79, namely a translatory degree along the plug-in axis 16.

In the second and third embodiments (FIG. 3 through FIG. 5), the plug-in device 10 comprises the displacement unit 68, upon which the mounting module 28 is arranged. The displacement unit 68 serves to displace the plug-in unit 12 at least partially along the plug-in axis 16. The mounting module 28 is arranged on the displacement unit 68 by means of the first bearing pins 48 of the first bearing unit 30, so that the plug-in unit 12 can be supported relative to the displacement unit 68 by means of the mounting module 28. The displacement unit 68 is configured as a scissors lift device.

REFERENCE SIGN LIST

10 Plug-in device
12 Plug-in unit
14 First plug-in element
16 Plug-in axis
18 Plug-in direction
20 First alignment element
22 Charging plug
24 Second plug-in element
26 Charging socket
28 Mounting module
30 First bearing unit
32 First axis
34 Second bearing unit
36 Second axis
38 Third bearing unit
40 Third axis
42 Main body
44 Second bearing cage
46 Third bearing cage
48 First bearing pin
50 Second bearing pin
52 Sliding bearing
54 First coil spring
56 Shaft shoulder
58 Second coil spring
60 Projection
62 Recess
64 Axis intersection point
66 Plug-in unit center of gravity
68 Displacement unit 70 Force application point
71 Traction element
72 Cable
74 Orientation spring element
76 Base plate
78 Traction direction
79 Plug-in element receptacle
80 Second alignment element
82 Insertion cone

The invention claimed is:

1. A plug-in device (10), comprising:
a plug-in unit (12) comprising:
a first plug-in element (14) having a plug-in axis (16) and a plug-in direction (18); and
a mounting module (28) comprising:
a first bearing unit (30), by means of which the plug-in unit (12) is mounted rotatably about a first axis (32) and is mounted displaceably along the first axis (32);
a second bearing unit (34), by means of which the plug-in unit (12) is mounted rotatably about a second axis (36) and is mounted displaceably along the second axis (36); and
a third bearing unit (38), by means of which the plug-in unit (12) is mounted rotatably about a third axis (40),
wherein the first axis (32), the second axis (36) and the third axis (40) intersect at an axis intersection point (64), and
wherein a plug-in unit center of gravity (66) of the plug-in unit (12) is arranged on the third axis (40) opposite to the plug-in direction (18) and spaced apart from the axis intersection point (64).

2. The plug-in device according to claim 1,
wherein the first axis (32) and the second axis (36), as well as the second axis (36) and the third axis (40), are each arranged perpendicular to one another.

3. The plug-in device according to claim 1,
wherein the third axis (40) and the plug-in axis (16) are arranged parallel to one another.

4. The plug-in device according to claim 1,
wherein the third bearing unit (38) together with the plug-in unit (12) is mounted rotatably about the second axis (36) and mounted displaceably along the second axis (36), and in that the second bearing unit (34) together with the third bearing unit (38) is mounted rotatably about the first axis (32) and mounted displaceably along the first axis (32).

5. The plug-in device according to claim 1,
wherein the plug-in unit (12) is resiliently mounted along the first axis (32) and/or along the second axis (36).

6. The plug-in device according to claim 1,
wherein the plug-in unit (12) is resiliently mounted about the third axis (40).

7. The plug-in device according to claim 1,
wherein the plug-in device (10) further comprises a displacement unit (68) upon which the mounting module (28) is arranged.

8. The plug-in device according to claim 1,
wherein the first plug-in element (14) is configured as a charging plug (22) or as a charging socket (26) for an electrically operated vehicle.

9. A plug-in system with the plug-in device (10) according to claim 1 and a plug-in element receptacle (79), wherein the plug-in unit (12) further comprises at least one first alignment element (20), and wherein the plug-in element receptacle (79) comprises a second plug-in element (24) and at least one second alignment element (80), which are arranged in such a way that the plug-in element receptacle (79) can be coupled with the plug-in unit (12), the at least one first alignment element (20) being configured for contacting the at least one second alignment element (80).

10. The plug-in system according to claim 9, wherein the at least one first alignment element (20) is arranged to project above a height of the first plug-in element (14) in the plug-in direction (18).

11. The plug-in system according to claim 9, wherein the at least one first alignment element (20) comprises two first alignment elements (20).

12. A plug-in device (10), comprising:

a plug-in unit (12) comprising:

a first plug-in element (14) having a plug-in axis (16) and a plug-in direction (18); and a mounting module (28) comprising:

a first bearing unit (30), by means of which the plug-in unit (12) is mounted rotatably about a first axis (32) and is mounted displaceably along the first axis (32);

a second bearing unit (34), by means of which the plug-in unit (12) is mounted rotatably about a second axis (36) and is mounted displaceably along the second axis (36); and a third bearing unit (38), by means of which the plug-in unit (12) is mounted rotatably about a third axis (40), wherein a force application point (70) is arranged on a rear side of the plug-in unit (12) for orientation of the plug-in unit (12).

\* \* \* \* \*